Oct. 31, 1961
S. LOEWE
3,006,566
BRAKING MAGNETIC TAPE REELS
Original Filed Oct. 3, 1956
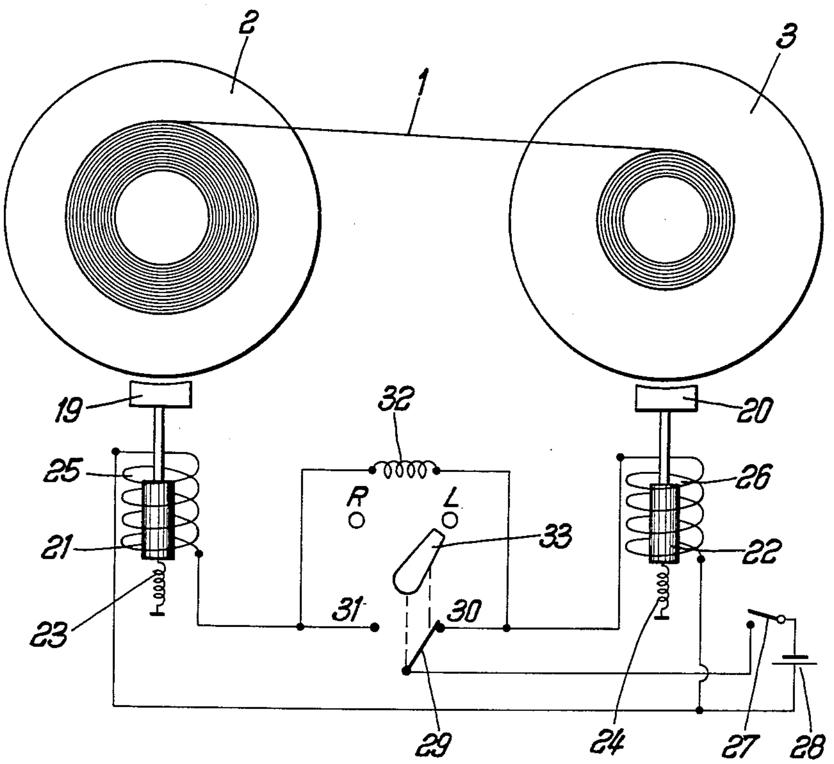
Inventor:
Siegmund Loewe

United States Patent Office 3,006,566
Patented Oct. 31, 1961

3,006,566

BRAKING MAGNETIC TAPE REELS

Siegmund Loewe, 68 Ridge Road, Yonkers, N.Y.

Original application Oct. 3, 1956, Ser. No. 613,794, now Patent No. 2,962,237, dated Nov. 29, 1960. Divided and this application June 13, 1960, Ser. No. 38,690
Claims priority, application Germany Oct. 5, 1955
1 Claim. (Cl. 242—55.12)

This application is a division of U.S. patent application Serial No. 613,794, filed October 3, 1956, now Patent No. 2,962,237.

In magnetic tape recorders, it is necessary to provide a braking device which stops the movement of the tape immediately. For this purpose, it is usual to lift the tape from the drive unit, e.g. the so-called sound pulley, and the magnetic heads so that it is no longer driven at normal speed and also does not drag unnecessarily on the magnetic heads. The tape is then pressed against a suitable fixed member and stopped.

This braking device does not cause any particular difficulties when it is operated only at the normal tape speed, that is, at the usual tape speed up to about 20 cm. per second. Difficulties, however, do occur to an increasing degree the higher the tape speed is at which the braking is to be effected, in particular at the so-called high speed. In this case the tape is wound off at high speed from one reel to the other. The faster these reels turn, the more kinetic energy must be absorbed by the braking device. Further, this must be performed within a very short period of time in order to stop the movement of the tape almost immediately. Hereby various disturbances of a very disadvantageous nature may occur, for example an excessive tape tension may arise when only the winding-off reel is braked, or also tape loops may be formed when the winding-up reel is braked more quickly or sooner than the winding-off reel.

It is an object of this invention to perform the braking process, in particular at high speed, so that the tape is immediately stopped withou any disturbances.

In accordance with the invention, both reels, the winding-off and winding-up reels, are braked for this purpose so that the kinetic energy of each single reel is absorbed on each reel thus avoiding excessive tape tension which, as mentioned, can otherwise occur. However, in accordance with the invention, means are provided which assure the braking of the winding-off reel to be somewhat sooner and rather more strongly than that of the winding-up reel. It is a further object of the present invention to provide means which perform this braking process much sooner and much stronger in order to allow it to be adapted in the special operating conditions.

The invention can be carried out by electromagnetic means.

The drawing shows an exemplary embodiment of the magnetic tape recording arrangement in accordance with the invention using an electromagnetic method for performing the desired braking effect.

The figure is a schematic view of an embodiment of the invention.

In the drawing an example is given for an electromagnetic method for performing the desired braking effect. The reels 2, 3 are braked electromagnetically. The armatures 21 and 22 are drawn into the coils 25, 26 against the action of the springs 23, 24, when the switch 27 is closed so that the current can flow from the current source 28 into the coils 25, 26. However, it is further necessary that the change-over switch 29 comes into contact with one of the two contacts 30, 31. The current then flows into one of the coils 25, 26 directly and into the other via the choke 32. The choke 32 increases the time constant of that coil circuit into which it is connected and thus causes a slower increase of the magnetic current in the respective coil and a delay of the braking effect.

In this figure, the choke 32 is connected in series with the coil 25 so that the braking shoe 20 contacts the reel 3 sooner and with more force than the braking shoe 19 contacts the reel 2. Now, the switch 29 is mechanically connected to the control lever 33 controlling the clockwise or anticlockwise motion of the tape. It is presumed in the figure that the tape is running in an anticlockwise direction, the reel 2 operating as winding-up reel. As explained, the braking shoe 20 comes into contact with reel 3 somewhat sooner and brakes with more force, as desired in accordance with the invention. If, on the other hand, the levers 29, 33 are switched over, then the direction of the tape is reversed. In this case, however, the braking shoe 19 is moved towards the reel 2 more quickly and with more strength, since, in this position, the coil 32 is connected in series with the magnetizing coil 26. Instead of using a choke, any other suitable combination and connection of resistance, condenser or coil may, of course, be employed to bring about the desired electrical delay action. In this case, too, it is possible to adjust the desired braking effects by suitably varying the electrical or mechanical dimensions.

What I claim is:

Magnetic tape recording arrangement comprising a pair of reels alternately driven for rotating in two directions for winding and rewinding the tape, braking means for stopping the rotation of said reels, electromagnetic coils for actuating said braking means, a choke, an electrical energizing source, and a commutator switch, said braking means consisting of two braking shoes, each engageable with one of said reels and actuated by one of said electromagnetic coils, said choke being alternately connected into the circuit of one or the other of said coils by means of said commutator switch for delaying the energization of that one of said coils which is connected to said energizing source via said choke the braking effect of one of said braking shoes thus being increased and performed sooner than the other.

References Cited in the file of this patent

UNITED STATES PATENTS 2,941,132 Pell ---------------- June 14, 1960